Dec. 10, 1940.  L. W. YOUNG  2,224,242
SMALL HOLE CUTTING ATTACHMENT FOR BLOWPIPES
Filed Nov. 8, 1938   3 Sheets-Sheet 1
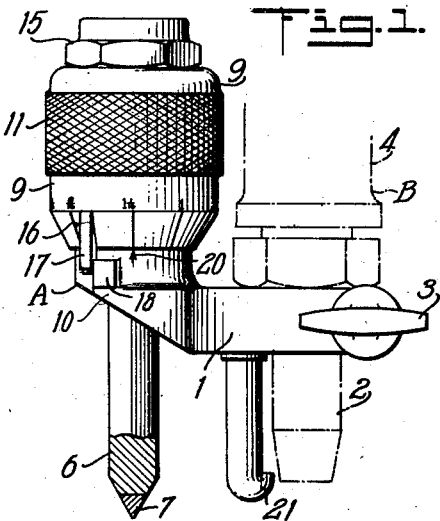
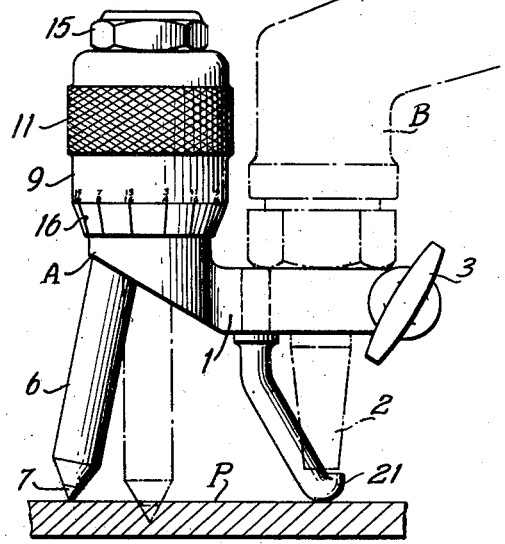
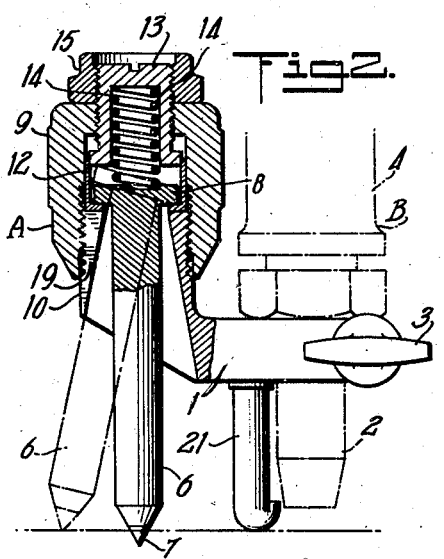
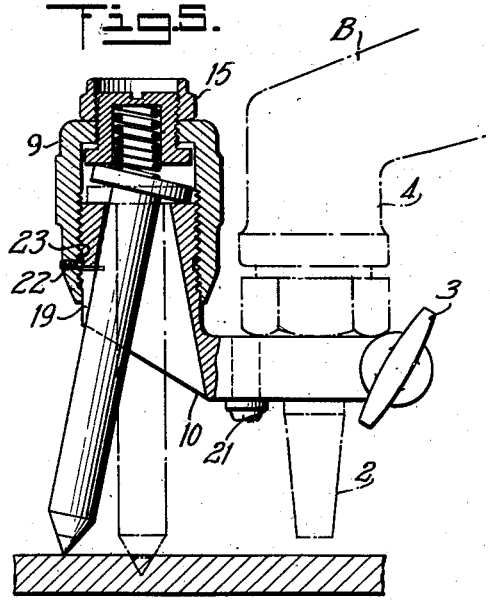
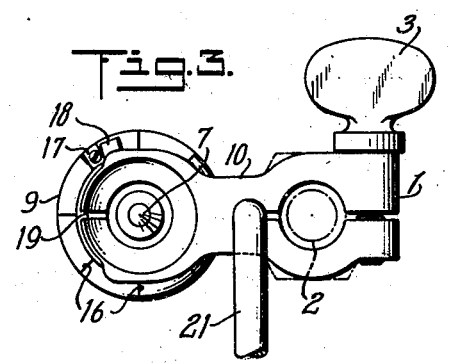
INVENTOR
LLOYD W. YOUNG
BY
ATTORNEY Dec. 10, 1940.  L. W. YOUNG  2,224,242
SMALL HOLE CUTTING ATTACHMENT FOR BLOWPIPES
Filed Nov. 8, 1938  3 Sheets-Sheet 2
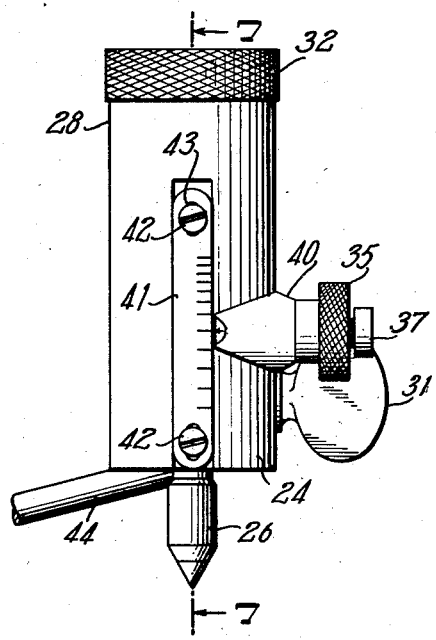
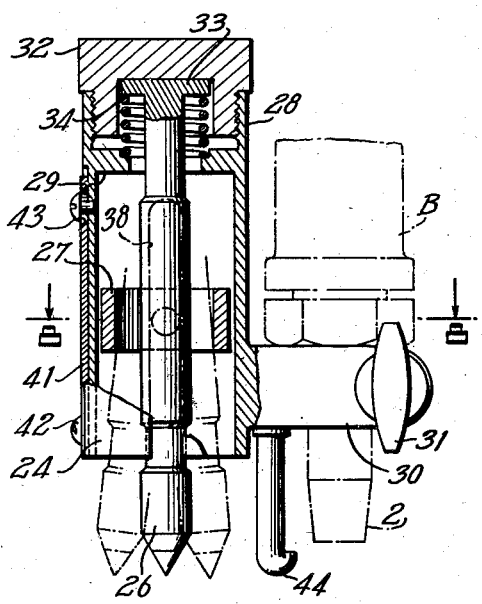
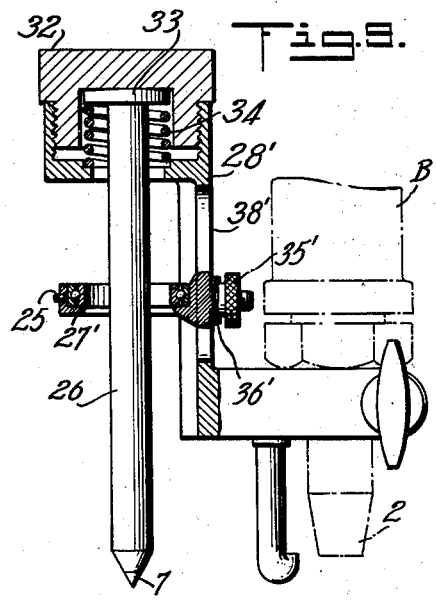
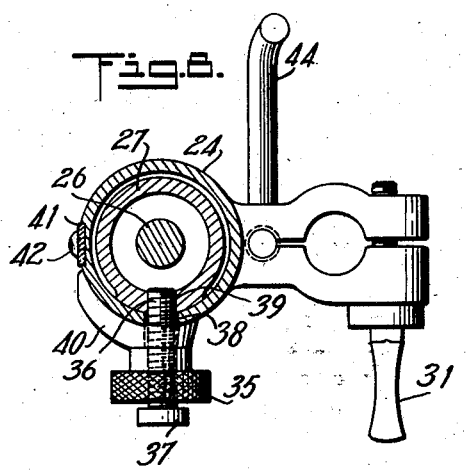
INVENTOR
LLOYD W. YOUNG
BY
ATTORNEY Dec. 10, 1940.  L. W. YOUNG  2,224,242
SMALL HOLE CUTTING ATTACHMENT FOR BLOWPIPES
Filed Nov. 8, 1938  3 Sheets-Sheet 3

INVENTOR
LLOYD W. YOUNG
BY
ATTORNEY

Patented Dec. 10, 1940

2,224,242

UNITED STATES PATENT OFFICE 2,224,242

SMALL HOLE CUTTING ATTACHMENT FOR BLOWPIPES

Lloyd W. Young, Scotch Plains, N. J., assignor to Oxweld Acetylene Company, a corporation of West Virginia Application November 8, 1938, Serial No. 239,455

24 Claims. (Cl. 266—23)

My invention relates to small hole-cutting attachments for blowpipes, and more particularly to such attachments wherein the work, such as a metal plate, supports the attachment for rotation about a central point spaced from the area of the hole to be cut.

In cutting metal plates with blowpipes, the usual practice is to project a preheating flame jet on to the work until the same is heated to the kindling temperature. A mixture of combustible gas, such as acetylene, and a combustion-supporting gas, such as oxygen, projected from the preheating orifices of the cutting blowpipe nozzle, is generally used for this purpose. A separate jet of cutting gas, such as oxygen, issuing from the nozzle is then applied to the plate to pierce the same by thermo-chemical reaction, and the blowpipe is moved to cut the work as desired. For best results the blowpipe nozzle should traverse the desired path at a constant speed while being held substantially normal to the plate and at a uniformly spaced distance therefrom.

In cutting circular holes, devices have been employed wherein the work locates the device by means of a punch mark at the center of the hole to be cut so that the cutting nozzle of the blowpipe may be rotated around such center. With such devices the centering pin loses its support when the circle nears completion, because the circular plug sags as the severing operation progresses. Furthermore, in cutting holes of about $\frac{7}{8}$ inch in diameter or less, difficulty is experienced on account of the center being too close to the cutting nozzle.

It is highly undesirable that deep punch marks be made in the work outside of the hole area, especially in plated sheet metal, such as chromium plated sheet iron or steel, or other polished surface, as such marks detract from the appearance of the work and injure the metal. The cutting of small holes in metal plate with reasonable accuracy and without locating deep punch marks or any punch marks outside of the hole area has been a problem of long standing to those skilled in the art.

Therefore, the main objects of my invention are: to provide an improved hole-cutting attachment for blowpipes; to provide a hole-cutting attachment for hand cutting blowpipes that is capable of cutting holes of relatively small diameter, such as $\frac{7}{8}$ inch in diameter and smaller; to provide a small hole-cutting attachment for use with gas cutting blowpipes that is capable of cutting small holes in metal plate with a reasonably high degree of accuracy and requiring at most a single light punch mark, or even no mark whatsoever in the plate outside of the hole area; to provide a small hole-cutting device that overcomes the disadvantages of the prior art, and fills the need set forth above of such prior art; and to provide an attachment of the character set forth of simple and economical construction, yet which is efficient and accurate in operation and effective for the purpose intended.

Other objects of the invention will appear below; and while details of the embodiments disclosed by way of example are set forth, the invention is not limited to these, since changes may be made without departing from the scope of the invention as claimed.

Referring to the drawings:

Fig. 1 is a view in side elevation of a blowpipe attachment embodying features of my invention, the blowpipe being shown by broken lines.

Fig. 2 is a view similar to Fig. 1 with part of the attachment broken away and shown in section.

Fig. 3 is a bottom plan view of the attachment shown in Figs. 1 and 2.

Fig. 4 is an elevational view similar to Fig. 1 of a slightly modified form of construction.

Fig. 5 is a sectional view of the modified construction shown in Fig. 4.

Fig. 6 is a view in front elevation of another modification.

Fig. 7 is a sectional view taken on the lines 7—7 of Fig. 6, the blowpipe being shown in broken lines, and the attachment being broken away and shown in section.

Fig. 8 is a sectional view of the attachment shown in Figs. 6 and 7, taken on the line 8—8 of Fig. 7.

Fig. 9 is a vertical sectional view of a form of construction similar to that shown in Figs. 6, 7 and 8, but wherein the skirt of the enclosing cylinder has been eliminated.

Figure 10:
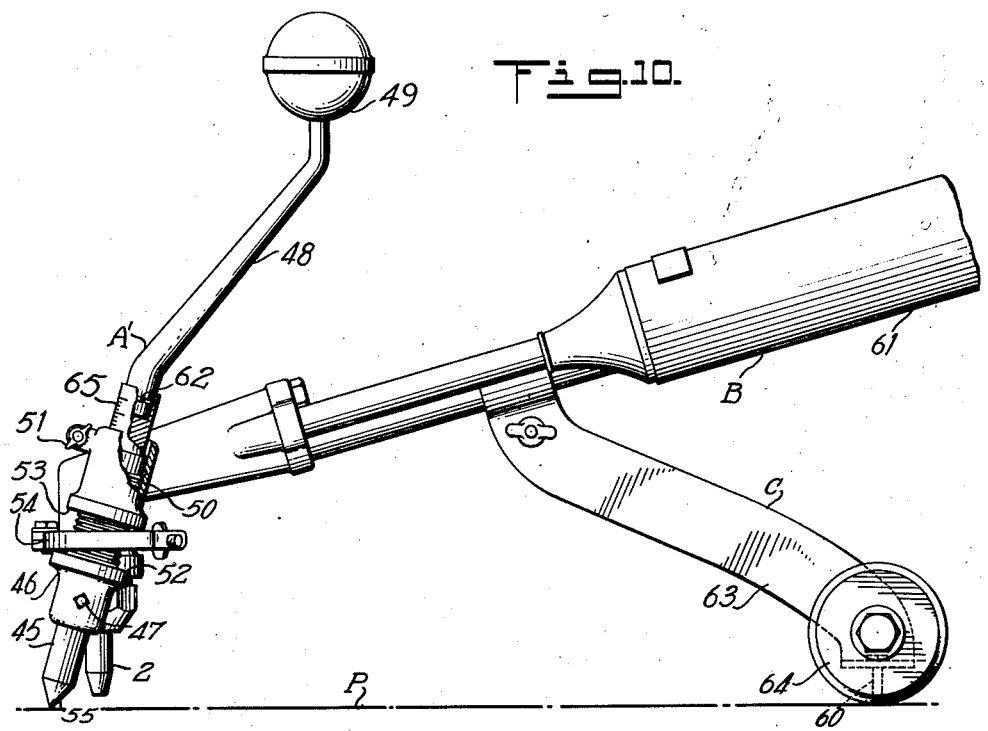
Fig. 10 is a view in side elevation of still another modification.

In general, I provide a small hole-cutting guide or attachment for blowpipes, comprising a support secured to the blowpipe nozzle, with a pin depending from the support and terminating in a point adapted to engage the work surface outside of the hole area. The pin may be rocked about the point of contact, the movement of said pin being confined, for example, to the space within a cone of revolution having its vertex at the point of contact. Thus, the blowpipe nozzle is caused to move in an orbit as the pin generates a cone of revolution. I also provide manually adjustable means for regulating the size of path to be followed, for example, the diameter of the circle to be cut, which means is calibrated to indicate the circle diameter for which the device is set.

Referring to Figs. 1, 2 and 3 of the drawings, the hole-cutting attachment A for the blowpipe B is provided with a transversely extending clamp or support 1 preferably constituting an integral part of the body of the hole-cutting attachment, the clamp being adapted to be slipped over the cutting nozzle 2 and tightened by means of a clamping screw 3. No particular attention in locating the hole-cutting attachment A relative to the nozzle 2 is required, although obviously the cutting nozzle 2 must be securely tightened relative to the blowpipe head 4.

The attachment A comprises a pivot pin 6 terminating at its lower end in a work engaging point 7 that is preferably formed of extremely hard metal such as "Stellite" to resist wear and insure long useful life, since any slippage of the point on the work would result in the cutting of an imperfect hole. The upper end of the pin 6 is provided with a flange 8 that is proportioned to fit closely inside an adjustment barrel 9. The adjustment barrel or thimble 9 is threaded to an upwardly extending vertical projection or body 10 of the clamp 1 and is externally knurled at 11. Disposed on top of the body 10 and within the thimble 9 is a guide cup 12 receiving the flange 8 of the pin 6. A pin-adjusting screw 13, threaded in the barrel 9 for adjustment within the guide cup 12, contains a coiled compression spring 14 constituting resilient centralizing means coacting with the top of the pin 6 to hold the pin parallel to the blowpipe nozzle, and coaxial with the cone of revolution. The screw 13, which is held in position by a lock nut 15, is especially useful for initially adjusting the attachment, and for making adjustments to compensate for wear after long continued use.

The barrel 9 is provided with calibrations 16, ranging, for example, from 1/16 inch to 1 1/16 inch diameter in 1/16 inch steps. The barrel 9 is threaded to the projection 10, so that the barrel may be moved away from or closer to the projection to increase or decrease the angle through which the flange 8 and the pin 6 roll. This rolling or wobbling motion is had only when the point 7 is in contact with the work and a circular rocking motion is imparted to the attachment, that is, the top of the pin, by manipulating the blowpipe B and consequently the support 1. The center pin 6 is rocked or tilted when in the position shown by the dotted lines in Fig. 2, a complete operation causing the pin to describe a conical surface, that is, the lateral curved surface about a cone.

In order that only one revolution of the barrel 9 is possible in making adjustments, the latter is provided with a stop pin 17 for coaction with a lug 18 on the attachment body 10. The attachment body 10 is split at 19 and expanded sufficiently to produce a frictional drag between the attachment body and the barrel 9. The body 10 of the attachment is provided with an index line 20 to which the calibration lines 16 are set.

An outrigger skid or arm 21 extends several inches to one side of the attachment for contact with the surface of the work, serving as an auxiliary support to maintain a positive vertical alignment of the cutting nozzle 2 in a plane extending transversely with respect to the blowpipe handle. Vertical alignment of the cutting nozzle in the other plane is easily attained by the operator maintaining substantially a fixed relation between the blowpipe handle and the work.

Referring now to Figs. 4 and 5 of the drawings, wherein like parts have been designated by like reference characters, the arrangement is similar to that described above in connection with Figs. 1, 2 and 3 with the exception that a stop screw 22 is threaded into the barrel 9 and runs in a groove 23 in the attachment body 10. Also, the split 19 provides an index line to which the calibrations 16 may be set. Further in Fig. 4, a work surface, such as a metal plate P, is shown supporting the skid 21 and the pin 6.

In the operation of the modifications shown in Figs. 1 to 5 of the drawings, a reasonably heavy punch mark is made in the center of the area of each hole to be cut. The barrel 9 is then rotated until the desired calibration 16, showing the hole size to be cut, coincides with the index line. The preheating flames are placed directly over the punch mark, no particular attention being paid to the location at which the center pin 6 or the skid 21 engage the work surface, as no punch mark is ordinarily required for the sharp hard center point 7. With the preheating flames thus positioned over the punch mark and with the skid 21 lightly contacting the work, the cutting gas valve of the blowpipe B is opened when the metal is sufficiently heated, to pierce the plate. While the plate is being pierced, the blowpipe is moved forward as far as possible, rocking or pivoting the pin 6 about its point 7 until the pin is in its most inclined position. A circular motion is then imparted to the blowpipe, the hole-cutting attachment serving as a guide, during which the pin 6 describes a cone of revolution with the result that a round hole is produced in the work by the blowpipe, concentric with the punch mark.

Various other devices may be employed to define the path of the motion by the wobbling of the pin 6, without departing from the basic idea. In Figs. 6, 7 and 8, another arrangement is disclosed which is substantially similar to that previously described, identical reference numerals being used to identify corresponding parts. A ring or annular band 27 is adjustable vertically over a portion of the center pin, to define the path which the top of the pin follows. The shape of the band 27 is determined by the shape of the hole desired, the path followed being similar in contour to that of the ring encompassing the pin 26. Accordingly, although the band may be elliptical, oval, or polygonal in cross section, it is herein disclosed as being circular merely for illustrative purposes.

The body 28 of the attachment is preferably a casting in the form of a hollow cylinder or tubular housing having a depending skirt 24 and an internal annular shoulder or flange 29. The body 28 is provided with an integral clamp 30 and a clamping screw 31 by means of which the device may be attached to the nozzle 2 of the blowpipe B in the manner described above in connection with Figs. 1 to 5 of the drawings. A body cap 32 is threaded into the upper end of the body 28 and is provided with a cavity for receiving a flange 33 at the upper end of pin 26. Disposed between the under surface of the flange 33 of the pin and the shoulder 29 of the body is a coiled compression spring 34 which normally acts to hold the pin 26 so that it is centrally disposed within the cylinder 28 so that its axis coincides with the axis of the cone of revolution within which the movement of the pin is limited by virtue of the ring 27. In this position the axis of the pin is parallel with the axis of the nozzle 2.

The ring 27 is vertically adjustable within the body 28, as by means of a knurled lock nut 35 that is threaded to an index locking screw 36 having a head 37. The screw projects through a vertical slot 38 in the wall of the skirt portion 24 and is threaded into the ring 27 at 39, the screw preferably being brazed in position after assembly with the ring. Associated with the index locking screw 36 for sliding along the outside of the body 28 is an index pointer and guide 40 adapted to cooperate with an index plate 41 secured to the body 28 by means of screws 42. The index plate 41 is vertically adjustable relative to the body 28 by means of elongated screw holes 43, to allow for error in manufacturing, for wear after long continued use, and to compensate for the various kerf widths produced by the different sizes of cutting nozzles.

The inside diameter of the adjustable vertical ring or annular bearing member 27 is proportioned to suit the range of holes for which the attachment is designed to operate, the vertical ring being secured in adjusted position along the axis by means of the clamping nut 35 which, when tightened, acts to lock the ring to the body 28 in the desired position. Sliding the ring downward, or closer to the plate, decreases the arc through which the center pin swings, producing a smaller hole. Raising the ring away from the work increases the arc through which the pin swings, resulting in the cutting of a larger hole.

The calibrations or indicia provided on the member 41 of the attachment coincide with the mark on the index pointer 40, disposed between the clamping nut 35 and the outside of the body 28. This arrangement makes it possible to set the attachment to any desired size of hole within the range of the attachment. A skid or arm 44 extends downwardly and laterally from the clamp 30 for contact with the surface of the work in the manner previously described in connection with Figs. 1 to 5 of the drawings.

Fig. 9 discloses a form of construction differing slightly from that shown in Fig. 7 in that the vertically adjustable annular band or ring preferably comprises a light-weight roller bearing or ball bearing 27' held within a collar 25, slidably mounted with respect to the vertical portion of the body 28'. A screw 36' projects from the collar 25 through a slot 38' in the vertical portion 28', engagement being made with the side walls of the slot by a nut 35' locking the collar in any desired vertical position. The skirting member 24 of the body 28 shown in Fig. 7 is accordingly eliminated, resulting in lower weight and smaller production costs. By employing a ball-bearing 27' in the slidable ring, less wear results from frictional engagement between the wall and the pin 6, and smoother motion is imparted.

It will be observed, for example, in Fig. 2, that as the pin tilts away from the vertical position, the entire attachment including the blowpipe is lowered slightly with respect to the work surface. For the small sizes of holes cut with the present invention, the degree of tilt is relatively small, and the change in the elevation of the cutting nozzle is negligible, especially since compensation may be made where conditions are critical, by initially setting the nozzle slightly higher than necessary in the support or clamp. The path followed by the top of the tilting pin is normally parallel with the work surface when circles are cut, and substantially parallel when ellipses or other shapes are cut. The slight lowering action is useful in that the pressure exerted downwardly against the blowpipe urges the pin to its greatest degree of tilt and maintains positive contact between the pin and the path defining means.

The operation of the modifications shown in Figs. 6, 7, 8 and 9 is substantially similar to that already described. After the piercing operation is completed, circular motion is imparted to the blowpipe, so that the pin 26 is tilted about a cone of revolution having its vertex at the point at which the pin engages the work, the nozzle meanwhile being guided in a circular path. The embodiments shown and described in connection with Figs. 1 to 9 provide for the cutting of small holes in the work, such as a steel plate, with a high degree of accuracy and without locating punch marks outside of the hole area.

Figure 11:
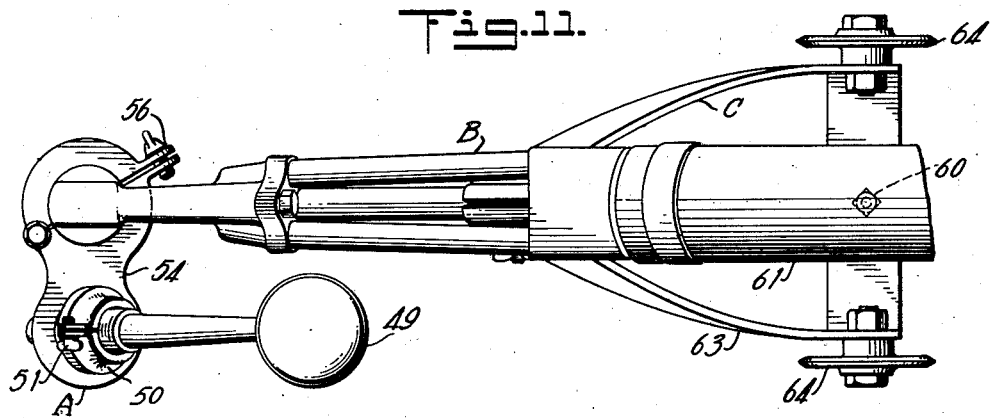
Fig. 11 is a top plan view of Fig. 10.

Figs. 10 and 11 of the drawings illustrate a small lightweight portable hole-cutting attachment A' that may be secured to any standard hand cutting blowpipe B. A substantially horizontal plate 54, which is secured at one end to the blowpipe nozzle 2 by means of a clamp 56, extends transversely away from the nozzle, being provided with a hole or aperture at a point separated from the nozzle, to receive the pivot pin assembly. The attachment A' preferably comprises a pin 45 preferably formed of hardened steel secured in the lower end of a sleeve 46 by means of a set screw 47. The upper end of the sleeve 46 is recessed or socketed to swivelly receive a crank handle 48 provided with a ball 49 at its upper end, the intermediate portion of the sleeve being threaded to receive a nut 50, which may be secured in adjusted position thereon by means of a clamp 51. Any convenient form of retaining means such as a split locking ring 62 engaging mated annular grooves in the handle 48 and sleeve 46, is employed to swivelly retain the handle within its socket.

The sleeve 46 is provided with a circular shoulder or flange 52 which coacts with a similar shoulder 53 on the nut 50 to provide upper and lower bearing surfaces for engagement with the plate 54. Such upper and lower surfaces of the plate 54 cooperate with the shoulders 52 and 53 to limit the movement of the pin 45 to the space within a cone of revolution having its vertex at the point 55 of the pin 45, which point is in engagement with the surface of a work piece P at a point outside of the path to be followed by the blowpipe nozzle. The size of such cone is indicated by calibrations 65 formed on the member 46.

It will thus be seen that the cutting tip 2 of the blowpipe B is caused to generate a cylinder of revolution when the pin 45 is moved around the lateral surface of the cone of revolution by manipulating the ball 49. The diameter of the cylinder of revolution generated by the blowpipe tip 2 is regulated as desired by changing the nut 50 in position on the sleeve 46 by reference to the calibrations 65.

A separate support is preferably provided to maintain the rear end of the blowpipe in operative relation to the work surface. Such a support may comprise a carriage C clamped or otherwise secured to the handle 61 of the blowpipe B, which carriage is formed of a frame 63 supported by trailing wheels 64 with a finger 60 depending from the frame at a point midway between the wheels for aligning the apparatus.

Figure 12:
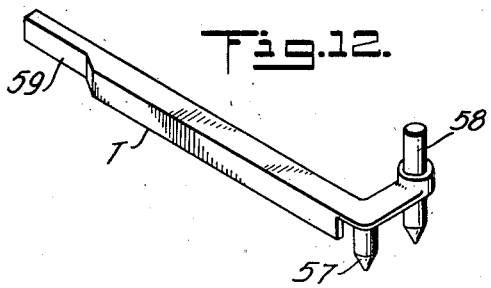
Fig. 12 is an isometric view of a center punching tool.

In the forms of the invention shown in Figs. 1 to 9, the apparatus can be located quickly by positioning the blowpipe nozzle over the center of the hole to be cut because the pivot pin also normally occupies a central position with respect to its path of movement. With the apparatus shown in Figs. 10 and 11, the center point for the pin 45 must be located with respect to the center of the hole to be cut if the location of the hole is at all critical. A locating tool T, shown in Fig. 12, may be used for this purpose. In laying out the holes to be cut, a punch mark or locating point is made in the center of each hole to be cut. Following this, the pin 57 of a locating tool T is placed with the point in the center of the hole area and a mark made beneath a center punch 58, for example, by striking the punch lightly with a hammer to indicate the central position of the pin 45. With the locating tool T in this position, a chalk line is made on the work with the aid of a straight edge 59. Such chalk line is used in locating the rear end of the blowpipe carriage with respect to the hole to be cut by aligning the finger 60 with the chalk line.

The blowpipe is then aligned with its nozzle over the center punch mark and with the finger 60 pointing at the chalk line. The pin 45 may then be located initially in a central position as indicated by the mark made by the punch 58.
With one hand on the blowpipe handle 61 and the other on the ball 49, the operator pierces the work while giving the ball a forward motion. After the plate is pierced, the ball 49 is given one complete circular motion during which a hole is cut in the work by the cutting jet from the nozzle 2.

By providing a swivel connection between the handle 48 and the member 46, smoother action is obtained, the handle swiveling within its socket when the device is operated. Although the ball 49 makes one complete revolution during each operation, the member 46 turns but a fraction of a revolution as a result of the rolling engagement of the flanges 52 and 53 on the plate 54.
By making the handle 48 in the form of a crank, additional leverage is obtained which assists in imparting the revolving and rocking motion to the pin 45.

The foregoing small hole-cutting apparatus described in connection with Figs. 10 and 11 operates to fullest advantage if the light locating mark outside of the area of the hole to be cut comprises a punch mark serving as a socket for the pin 45, but the apparatus permits cutting holes of extremely small diameter, and is desirable if the one light locating punch mark outside of the hole area to be cut is not objectionable.

From the foregoing description of my invention it will be apparent to those skilled in the art that I have provided an attachment which may be quickly secured to any standard blowpipe, and by means of which real small holes may be cut in the work without the need of any punch marks in the surface of the work, either within or outside of the area to be cut. The described and illustrated embodiments of my invention are accurate in operation, and are efficient and effective for the purpose intended. The various forms of construction herein described indicate how the broad principles may be varied to suit specific needs.

Other modifications will readily suggest themselves to those skilled in the art.

I claim:

1. Guiding mechanism for a flame-cutting blowpipe comprising a support, a pin tiltably mounted at its upper end on said support in spaced relation to the nozzle of such cutting blowpipe, said pin being adapted at its lower end to pivotally engage the work surface at a point without the path to be followed by said blowpipe, the upper end of said pin being free to move along a path substantially parallel to said work surface; means for defining the path of movement of said pin; said support being adapted to be secured to said blowpipe and being adapted to communicate said movement along said path to the nozzle of said blowpipe.

2. Guiding mechanism for a flame-cutting blowpipe comprising a support secured to said blowpipe and extending transversely away from the nozzle thereof; a pin pivotally depending from said support, said pin at its lower end being adapted to pivotally engage a work surface at a point thereon spaced away from the shape to be cut by said cutting blowpipe; and means for directing the movement of the upper end of said pin about a path of predetermined shape substantially parallel to said work surface, the motion of the upper end of said pin about said path being conveyed through said support to the nozzle of said cutting blowpipe.

3. Guiding mechanism as set forth in claim 2 including means for varying the size of such path.

4. Guiding mechanism for a flame-cutting blowpipe comprising a support adapted to be secured to said blowpipe and to extend transversely away from the nozzle thereof; a pin depending from said support, and adapted to engage the work surface at a point separated from the path to be followed by the nozzle of said blowpipe, said pin being free to pivot about the point of contact with said work surface in response to motion imparted by said support to the upper portion of said pin; and means for defining the path of movement of said pin.

5. Guiding mechanism as set forth in claim 4 including means for normally urging said pin into a position substantially parallel with the nozzle of said blowpipe.

6. A hole-cutting attachment for a cutting blowpipe comprising a support secured to said blowpipe and extending transversely away from the nozzle thereof; a pivot pin depending from said support for engagement at its lower pointed end with a working surface, said pin being free to tilt in all directions and being free to describe a cone, the vertex of which constitutes the lower pointed end; and means for limiting the degree of tilt comprising a ring surrounding said pin.

7. A hole-cutting attachment as set forth in claim 6 wherein said ring comprises an annular roller bearing the inner periphery of which is adapted to engage said pin.

8. A hole-cutting attachment for a cutting blowpipe comprising a support adapted to be secured to the nozzle of said cutting blowpipe and to extend transversely therefrom; a vertical projection extending upwardly from said support at a point separated from said nozzle; a pin pivoted to and depending from the upper portion of said projection, said pin being pointed at its lower end for pivotal engagement with the work surface at a location outside of the path to be followed by said nozzle, the upper end of said pin thereby being free to move along a path in a plane substantially parallel with the work surface; and means for engaging said pin to limit the path of movement.

9. A hole-cutting attachment as set forth in claim 8 wherein such pin-engaging means comprises a ring encompassing said pin, said ring being secured to said vertical projection and being vertically movable with respect thereto.

10. A hole-cutting attachment as set forth in claim 8 wherein such pin engaging means comprises a ring slidable along said vertical projection, said projection being provided with indicia designating the size of the path followed for the respective positions of said ring.

11. A hole-cutting attachment as set forth in claim 8 including an auxiliary support depending from said first-mentioned support for engaging the work surface to assist in maintaining said nozzle in a vertical position.

12. A small hole-cutting attachment for blowpipes, comprising in combination: a support adapted to be secured to said blowpipe; a pin pivotally secured to said support in spaced relation to the nozzle of said blowpipe and terminating at its lower end in a point adapted to engage a work surface; and means associated with said support for limiting the pivotal movement of said pin to the space within a cone of revolution having its vertex at said point.

13. A small hole-cutting attachment for blowpipes, comprising in combination: a blowpipe holder adapted to be secured to the nozzle of a blowpipe; a pin pivotally depending from said holder and terminating in a point for pivotal engagement with a work surface; means engaging said pin for limiting the movement of said pin to the space within a cone of revolution having its vertex at said point, said blowpipe holder mounting the blowpipe at a distance from said pin so that the nozzle of said blowpipe is caused to travel in a circular path separated from the point of pivotal engagement of said pin with said surface when said pin is moved around the lateral surface of such cone of revolution.

14. A small hole-cutting blowpipe attachment comprising: a pin terminating in a work-engaging point; means limiting the movement of said pin to the space within a cone of revolution having its vertex at said point; a blowpipe holder adapted to be connected to a blowpipe, said holder pivotally supporting said pin at a point spaced from the nozzle of said blowpipe for transmitting the circular movement of said pin to said blowpipe; means for adjusting the effective radius of such cone of revolution to fix the radius of movement of the blowpipe; and means initially acting to cause the axis of said pin to coincide with the axis of such cone of revolution.

15. A blowpipe attachment comprising a vertical tubular housing secured in spaced relation to a blowpipe nozzle and being provided with a vertical slot; a cap threaded to said housing; an internal annular shoulder within said housing spaced below said cap; a pivotable pin extending within said housing and having an annular flange seated between said shoulder and said cap; spring means engaging said flange to urge said pin into coaxial relation with said housing; an annular bearing member disposed in said housing for encompassing said pin; and external means extending through said slot and connecting with said bearing member for vertically adjusting said bearing member.

16. A blowpipe attachment comprising supporting means adapted to be attached to and extend from a blowpipe nozzle; a pin tiltably mounted on said supporting means at a point spaced from said nozzle and having a work engaging point; means limiting the tilting movement of said pin to the space within a cone of revolution; and means for adjusting the radius of such cone of revolution.

17. A blowpipe attachment comprising a support adapted to be fixed relatively to a blowpipe nozzle; a work engaging pin pivotally depending from said support at a point spaced from said nozzle; spring means initially acting to hold said pin in parallel relation with the blowpipe nozzle; means limiting the pivotal movement of said pin to the space within a cone of revolution; and means for adjusting the radius of such cone.

18. A blowpipe attachment comprising a blowpipe nozzle clamp provided at a point spaced from said nozzle with a vertically disposed cylinder having a conical inner surface; a barrel threaded on said cylinder for vertical adjustment; a pointed pin extending within said cylinder for engaging a work surface; a top flange on said pin normally seated on the top of said cylinder; a cap threaded to said barrel for vertical adjustment and having an inner annular bearing surface for engaging the top surface of said flange; a coiled compression spring engaging said flange and cap to urge said pin into normally centered position, said pin being free to tilt against the action of said spring to generate a cone of revolution having its vertex at the pointed end of said pin, to thereby guide the movement of the nozzle through a predetermined circular path the radius of which is controlled by the distance between the bearing surface of said cap and the top of said cylinder.

19. A blowpipe attachment comprising a horizontally disposed plate secured at one end to the nozzle of said blowpipe and being provided at its other end with an aperture; a pointed pin extending through said aperture for engagement with a work surface; annular bearing members on said pin above and below said plate for rolling contact with the opposite surfaces of said plate; and a hand crank extending from the upper end of said pin for moving the latter so that its axis follows a conical surface having its vertex at the pointed end of said pin, said nozzle being thus caused to travel in a circular path.

20. A blowpipe attachment as set forth in claim 19 wherein at least one of said annular bearing members is adjustable to vary the distance between said members, and consequently the proportions of the conical surface and the size of the circular path.

21. A blowpipe attachment as set forth in claim 19 wherein said crank is swivelly connected to said pin.

22. A blowpipe attachment as claimed in claim 19 including a wheeled carriage adapted to engage said work surface and to be secured to said blowpipe in spaced relation to said pin, and adapted to support said blowpipe for motion longitudinally with respect to the blowpipe handle.

23. A small hole-cutting attachment for a cutting blowpipe, comprising in combination: a substantially horizontal support secured at one end to the nozzle of said blowpipe, said support being provided with a laterally spaced hole at a point separated from said nozzle; a pin extending through said hole; bearing members disposed between said pin and said support for causing said pin to generate a cone of revolution when revolved about its lower pointed end as a vertex; means for adjusting the distance between said bearing members to fix the radius of such cone of revolution; and calibrated means for indicating the radius for which said last-named means is set.

24. A blowpipe attachment comprising a support adapted to be secured adjacent to the nozzle of a blowpipe; a pin; means pivotally mounting said pin on said support at a position spaced from said nozzle; said pin projecting downwardly from said support and being pointed at its lower end for pivotal engagement with a work surface, such mounting means including annular flange means extending radially outward from said pin adjacent to the top portion thereof, said support being provided with surfaces for engaging said annular flange means to confine the degree of pivoting of said pin.

LLOYD W. YOUNG.